United States Patent [19]

Dunaway et al.

[11] Patent Number: 4,971,629
[45] Date of Patent: Nov. 20, 1990

[54] METHOD OF PREPARING AGGREGATED PIGMENTS FROM CLAYS

[75] Inventors: Weyman H. Dunaway, Sandersville; Lev F. Verbov, Milledgeville, both of Ga.

[73] Assignee: ECC America Inc., Atlanta, Ga.

[21] Appl. No.: 417,784

[22] Filed: Oct. 4, 1989

[51] Int. Cl.[5] ............................................. C09K 1/02
[52] U.S. Cl. .................................. 106/468; 106/407; 423/328; 501/147
[58] Field of Search .............. 106/407, 468; 423/328; 501/147

[56] References Cited

U.S. PATENT DOCUMENTS

| | | | |
|---|---|---|---|
| 3,586,523 | 6/1971 | Fanselow et al. | 106/288 B |
| 3,616,900 | 11/1971 | Cecil et al. | 106/288 B |
| 3,655,038 | 4/1972 | Mercede | 209/5 |
| 3,661,515 | 5/1972 | Iannicelli et al. | 23/110 R |
| 3,765,825 | 10/1973 | Hurst | 432/18 |
| 3,765,825 | 10/1973 | Hurst | 432/18 |
| 3,769,383 | 10/1973 | Hurst | 423/328 |
| 4,075,280 | 2/1978 | Fitton et al. | 423/118 |
| 4,381,948 | 5/1983 | McConnell et al. | 106/288 B |
| 4,499,062 | 2/1985 | Christophliemk et al. | 423/332 |
| 4,806,167 | 2/1989 | Raythatha | 106/468 |
| 4,812,299 | 3/1989 | Wason | 423/328 |
| 4,816,074 | 3/1989 | Raythatha et al. | 106/468 |
| 4,851,048 | 7/1989 | Jones et al. | 106/468 |

FOREIGN PATENT DOCUMENTS 1084478 8/1980 Canada.

Primary Examiner—William R. Dixon, Jr.
Assistant Examiner—Willie Thompson
Attorney, Agent, or Firm—Klauber & Jackson

[57] ABSTRACT

Aggregation of kaolin particles by wet processing using a hydrothermal technique is described. Calcined clay is first digested in a solution containing NaOH and the obtained sodium silicate solution is separated. Aggregation of uncalcined clay particles by hydrothermal treatment is then carried out using the obtained solution. The method enables aggregation of low grade clays unsuitable for calcination. A two-stage hydrothermal process is also described. Bleaching with oxygen or bleaching compounds may be effected during hydrothermal treatment.

13 Claims, 2 Drawing Sheets

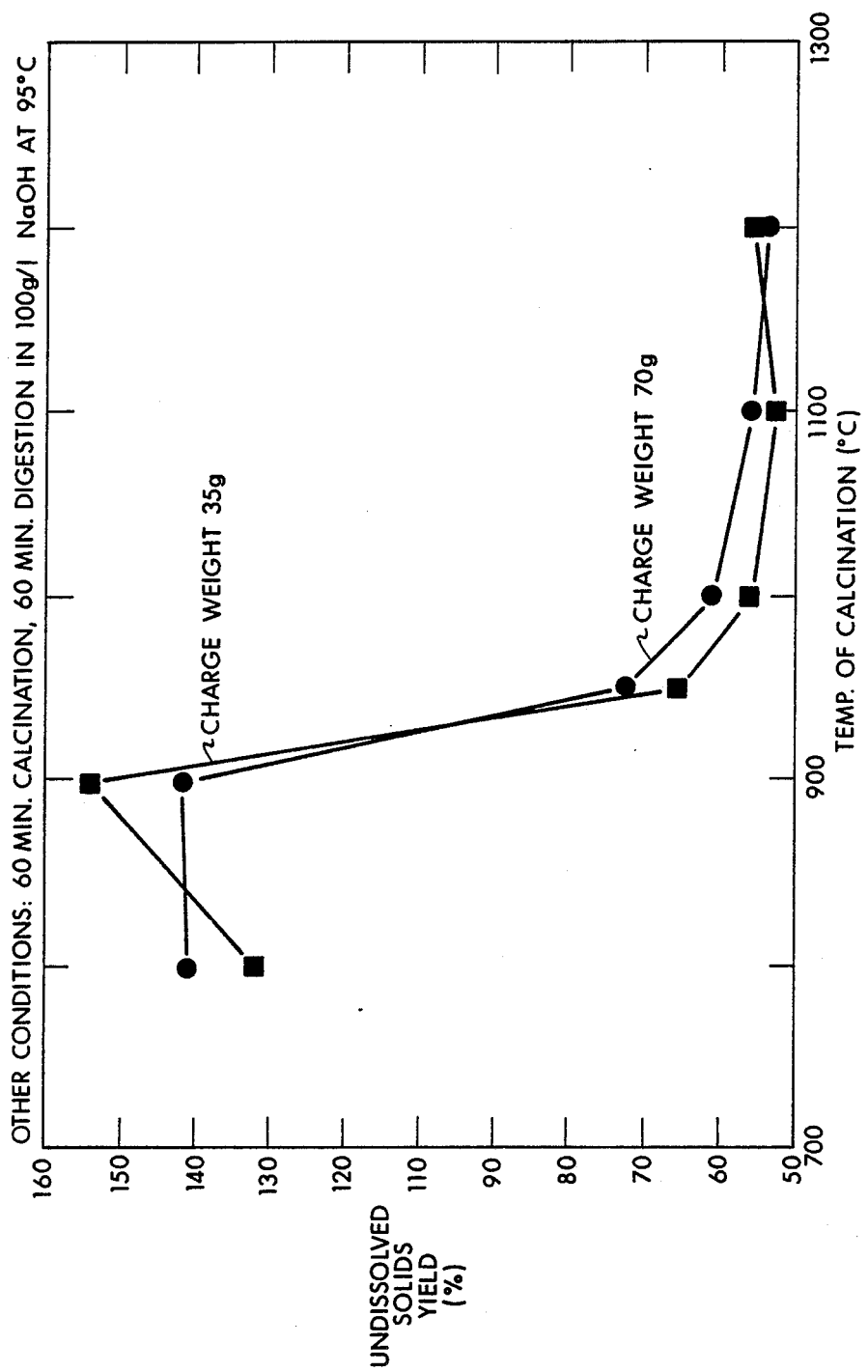

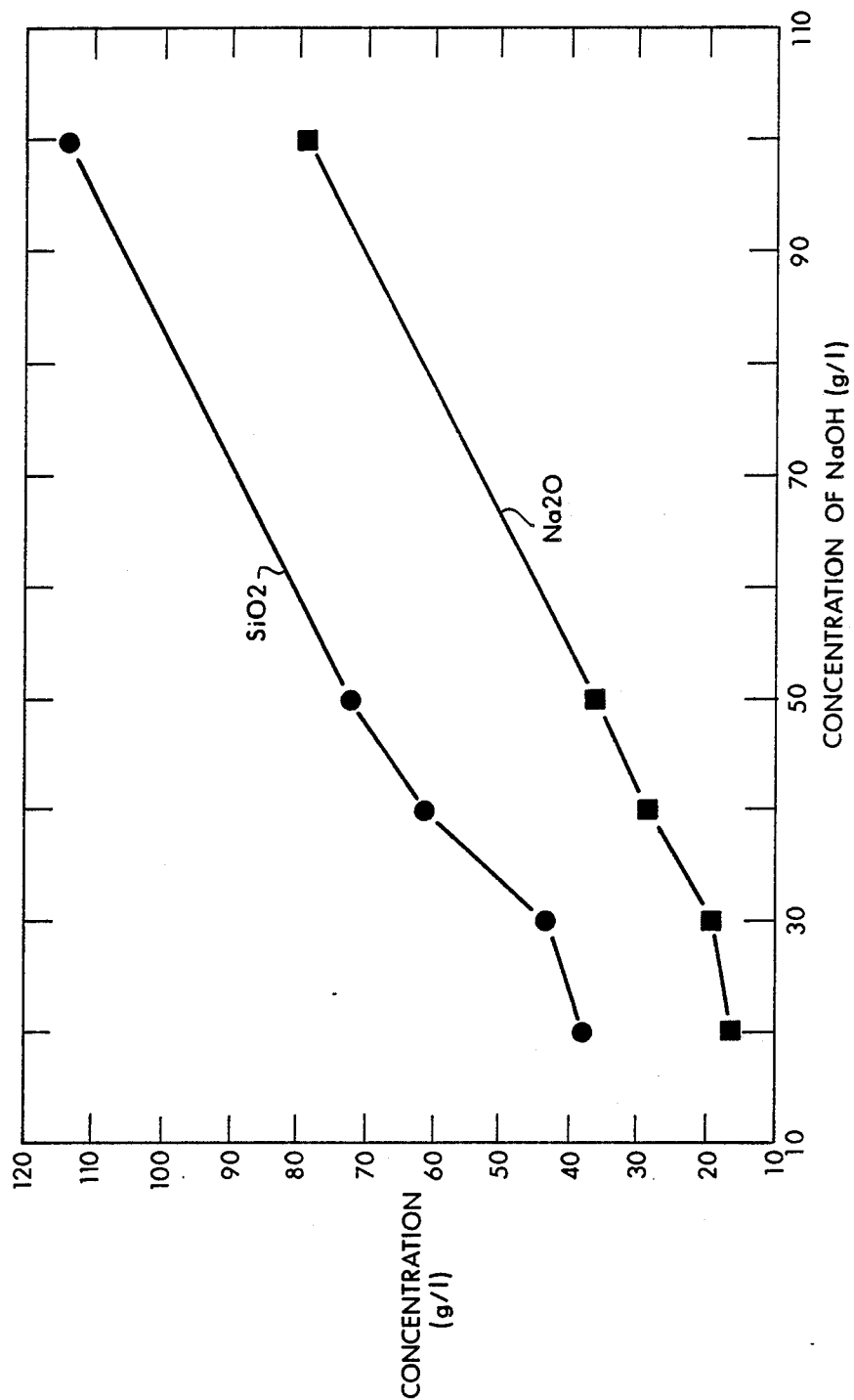

METHOD OF PREPARING AGGREGATED PIGMENTS FROM CLAYS

FIELD OF THE INVENTION

This invention relates to the preparation of aggregated pigments from clays by hydrothermal treatment. Further, it relates to oxidative bleaching during hydrothermal treatment for producing bulking pigments.

BACKGROUND OF THE INVENTION

In U.S. Pat. No. 4,075,280 issued Feb. 21, 1978 to R. C. Fitton et al there is disclosed a process for preparation of zeolites such as zeolite A having increased ion exchange capacities, and improved usefulness in detergent and water purification applications, which comprises reaction of a calcined clay under conditions of high shear in contact with a portion of an alkali metal hydroxide solution, thereafter gradually increasing the temperature of the resulting mixture while adding the additional amount of alkali metal hydroxide solution under conditions of high shear, and recovering the zeolite product.

The reaction of sodium silicate with kaolin clays has been studied under various hydrothermal conditions, as reported by Kurbus et al. *Z. Anogr. Allg. Chem.*, 1977, Volume 429, pages 156-161. These reactions were studied under hydrothermal conditions using essentially equivalent molar ratios of the kaolin and sodium silicate with the reaction being carried out in an autoclave. The products of the reactions, as identified by x-ray, electron microscope, and infrared methods, showed that sodium silicate reacts with kaolin to form an aluminosilica gel or a crystallized zeolite mineral analcime of the formula:

$$Na_2O:Al_2O_3:4SiO_2:2H_2O$$

In the reaction, the kaolin dissolves and alphaquartz simultaneously appears in the product of reaction.

U.S. Pat. No. 4,812,299 issued Mar. 14, 1989 to S. K. Wason describes compositions designated as synthetic alkali metal alumino-silicates, or simply SAMS, prepared by the hydrothermal reaction of an alkali metal silicate and kaolin clay. By the term "hydrothermal" it is meant that the reaction is carried out under aqueous conditions of elevated temperatures and pressures of greater than atmospheric. The preferred temperatures range from 140°-250° C. The preferred pressure conditions comprise pressures ranging from 50 to 360 psig. The reaction is conducted under conditions of agitation. In a preferred operation of the said process, the aqueous slurry of the starting clay material and the alkali metal silicate is formed, the system is closed and heat applied to gradually raise the temperature. In general, the pressure in the system will range from about 50 to 360 psig at temperatures ranging from about 140 to 250 degrees C. A specifically preferred range of conditions is to operate the process at pressures of 100 to 200 psig and temperatures of 164 to 194 degrees C. The temperatures are preferably correlated to the pressure such as that provided by steam. The reaction time is about 0.25 to 4 hours. After completion of the reaction, heat is removed and the mixture is allowed to cool, after which the system is opened, the product separated by filtration or centrifugation, washed with water, and dried. Spray drying is preferred at inlet temperatures of 1000° F. (538° C.) and outlet temperature of 250° F. (121° C.).

The products are defined as structured agglomerates wherein the primary particles comprise altered kaolin clay platelets integrated with one or more adjacent areas of essentially amorphous alkali metal silicate base-kaolin clay reaction products. More specifically, they are described as altered kaolin platelets having an integrated rimmed area of amorphous, non-diffracting alkali metal silicate-kaolin reaction product. The products are said to be useful as reinforcing agents or fillers for papers, paints, plastics and rubber and to have increased opacity and brightness as compared with the starting clay material.

U.S. Pat. No. 4,816,074 issued Mar. 28, 1989 to Rasik H. Ravthatha et al, assigned to E.C.C. America Inc., describes a process in which a structured aggregated kaolin-pigment is prepared by mixing substantially dry kaolin in particulate form with an aqueous alkali metal silicate to deposit on the surface of the kaolin particles a substantially molecular level of said silicate without formation of silica gel, drying the treated kaolin without calcination and exposing it to an acidic gas. The product is useful as a pigment in the coating or filling of paper. The process serves to aggregate the very fine particles (i.e. the sub 0.25 micrometer particles) present in very fine feeds. Thus, the otherwise large percentages of troublesome extremely fine particles are effectively removed as separate entities, but without the need for separation steps, together with the costly equipment required for such operations.

In U.S. Pat. Nos. 3,655,038; 3,616,900 and 3,661,515, also Swedish patent No. 14603, there are disclosed methods of improving the brightness of contaminated kaolin clays by treatment with an oxidizing agent.

U.S. Pat. No. 3,765,825 issued Oct. 16, 1973 to V. J. Hurst teaches reducing the viscosity of kaolin clay slurries by hydrothermal treatment. In U.S. Pat. No. 3,769,383 issued Oct. 30, 1973, he teaches hydrothermal treatment of kaolin to produce a variety of alumino-silicate products.

U.S. Pat. No. 4,499,062 issued Feb. 12, 1985 to P. Christophliemk et al teaches hydrothermal decomposition of industrial waste products such as filter sludge containing aluminum silicate and/or alkali aluminum silicate, by addition of aqueous NaOH solution and sand.

Canadian Pat. No. 1084478 issued Aug. 26, 1980 to M. P. Jameson et al relates to the preparation of ion-exchange zeolites by the reaction of calcined kaolin clay with a source of alkali metal oxide, in which metakaolin is first chlorinated at a temperature in the range of 600° to 980° C. to volatilize iron impurities before carrying out said reaction.

SUMMARY OF THE INVENTION

An object of the invention is to prepare aggregated pigments from uncalcined kaolin clay useful in paper fillers and coatings.

In one aspect of the invention, an aggregated pigment is produced from clay by using a combined digestion-aggregation process. The process includes the following steps:

(1) Calcination of the clay (kaolin) at 1000°-1200° C. for 0.1-4 hours;

(2) Digestion of the calcined clay in a solution containing 5-400 g/l NaOH at 80°-100° C. for 0.2-4 hours;

(3) Separation of the obtained sodium silicate solution (also termed the "glue") and recovery of the cake;

(4) Aggregation of uncalcined clay with the obtained solution at 130°-250° C. for 0.1-4 hour, mixer speed 500-2500 rpm under pressure of 30-360 psi at a solids concentration of 4-25%

(5) Separation of aggregated product from the liquid phase;

(6) Re-use of obtained liquid phase after addition of NaOH for digestion of next portions of calcined clay.

The process is carried out in a manner such that the liquid phase circulates and is repeatedly re-used. No addition of outside sodium silicate is required.

Wide varieties of clays can be processed including inferior, low grade clays which may be unsuitable for calcination. Discolored clays having low brightnesses can also be used as feed for the present processes, and unexpectedly brightened pigments are thereby yielded. Preferred conditions are: preferable temperatures: for calcination 1100° C., digestion 90°-95° C., aggregation 170° C.; preferable dosage for digestion 280 g clay and up per 1 liter of NaOH solution; preferable solids concentration for aggregation 6-10%; preferable pressure 120-140 psi.

The advantages of this invention over the prior art are as follows:

(1) The starting materials are only clay and the NaOH solution.

(2) Process can be arranged as a batch or continuous with re-use of the liquid phase.

(3) There is no waste since the cake obtained following digestion can be used as a special pigment.

(4) Provides the opportunity to use the method for processing low grade clay and waste materials which otherwise could not be processed.

(5) Properties of the product can be controlled.

Thus, the technological approach for this hydrothermal clay processing can be generally outlined as a combination of two main procedures: digestion of clay in NaOH solution, and aggregation of the mixture containing a fresh clay and the glue obtained by digestion. Regardless of the type of operation (i.e. batch or continuous) the technological approach will provide for circulation and re-use of the liquor obtained after separation of the aggregated product.

The highest degree of depletion of the liquor during aggregation is desirable from the point of view of highest recovery and lowest material streams with components circulating as inert reagents.

On the other hand, the highest degree of extraction of $SiO_2$ from the clay (i.e. the highest saturation of the ultimate amount of the obtained solution) is desirable in digestion. That degree of depletion and/or saturation of solutions can also be controlled by varying the amount of $Na_2O$ in the system.

In another aspect of the invention, two-stage hydrothermal aggregation of clay (kaolin) is carried out.

Preparation of aggregated product includes the following steps: (1) Calcination of the clay (kaolin) at 1000°-1200° C.; (2) Two-stage hydrothermal treatment of calcined clay in 5-400 g/l NaOH solution. The first stage is performed at 80°-105° C. for 0.1-4 hr. The second stage is performed by raising the temperature to 140°-250° C. and holding for 0.2-4 hour. The two stages may be carried out without interruption or may be carried out separately with addition of uncalcined clay after the first stage is completed. The cake obtained after the first stage may be partially or wholly substituted by uncalcined clay.

Wide varieties of clays can be processed. Preferable temperatures: for calcination 1100° C., for first stage 90°-95° C., for second stage 170° C. Preferable pressure 120-140 psi. Mixer speed 500-2500 rpm.

According to the invention, increased brightness of aggregated products during hydrothermal treatment of a mixture comprising clay and sodium silicate can be achieved by conducting the treatment under an oxidizing atmosphere. The method may be applied in the above-described combined digestion-aggregation or in the two-stage hydrothermal aggregation; or it may be applied whenever such clay-sodium silicate mixture is subjected to hydrothermal treatment.

The method comprises the following steps:

(1) preparation of a slurry containing clay, sodium silicate and water;

(2) bubbling oxygen through the slurry for 1-10 min. at room temperature and atmospheric pressure in a reactor;

(3) sealing the reactor and (optionally) applying additional oxygen pressure of above 0 to 200 psi;

(4) heating the slurry to 170°-250° C. for 0.2-4 hour at a mixer speed of 500-2500 rpm. Other bleaching means may be used such as oxidative bleaching compounds, e.g., peroxide, permanganate, etc.

The process is accomplished during hydrothermal treatment. Additional heating equipment is not required. The brightness of the resulting aggregated product is higher by 1-2 units.

BRIEF DESCRIPTION OF THE DRAWINGS

FIG. 1 illustrates the effect of calcination temperature on clay digestion; and

FIG. 2 illustrates the effect of NaOH concentration on the "glue" composition.

DETAILED DESCRIPTION

Digestion Studies

The crude kaolin used as a feed in this Example was a fine particle size "grey" kaolin of the type described in McConnell, U.S. Pat. No. 4,381,948. A clay of this type is also discussed in Fanselow et al. U.S. Pat. No. 3,586,523. Prior to digestion, at 95° C. in NaOH solution the kaolin feed was calcined at 800°-1200° C. for 1 hour. Concentration of the solution was varied in the range 20-200 g/l NaOH. The effect of calcination temperature on the recovery (e.g. weight of the cake) is shown in FIG. 1. The acceptable range of clay dissolution is achievable at calcination temperature of 1000°-1200° C.

Concentration of $SiO_2$ and $Na_2O$ in obtained sodium silicate solutions after single digestions is shown in FIG. 2. FIG. 2 also shows that the lower the NaOH concentration in the starting solution, the higher the $SiO_2/Na_2O$ ratio that can be attained in the resulting liquor.

The highest yield (i.e. weight of the clay transferred to the solution) of 39% was achieved at the following conditions: calcination temperature of 1100° C. and 1150° C., concentration of the solution 200 g/l NaOH, and a charge of 140 g clay per 1 liter of the solution. When a charge of 280 g was used, the yield was equal to 21.1% and 32.6% for solutions of 50 g/l NaOH and 200 g/l NaOH, respectively.

Experiment has also shown that the content of $SiO_2$ in the liquor can be increased by using a repeated digestion of a fresh portion of the clay in the resulting liquor. Thus, analyses indicated that after repeated digestion, the obtained liquor contained 168 g/l $SiO_2$ at an $SiO_2/Na_2O$ ratio of 2.6.

EXAMPLE I

A water-washed grey kaolin, the particles by weight of which are 90% <0.5μ was used as feed, and was calcined at 1100° C. for 1 hour. Then 700 g of calcined clay was digested in 2.5 liter of solution containing 40 g/l NaOH at 95° C. for 1 hour, and the solid phase was separated and dried. The yield of solid phase was 78%. The 600 ml of obtained liquor was mixed with 105 g uncalcined clay and water was added to 1500 g of the total weight. The resulting mixture was hydrothermally aggregated in a high-pressure reactor at 170° C. under a mixer speed of 2500 rpm for 50 minutes. After cooling the slurry was filtered and dried at 110° C. The product obtained had an average particle size of 4.0μ, and the total pore volume of 2.35 cm³/g.

EXAMPLE II

Example I was repeated for a further sample of the same crude kaolin clay. The yield of solid phase after digestion was 76%. The aggregated product obtained had an average particle size of 3.4μ, and the total pore volume of 2.14 cm³/g.

EXAMPLE III

In a two-stage hydrothermal aggregation process, 168 g of kaolin clay calcined at 1100° C. for 1 hour was mixed with 1200 ml of a solution containing 30 g/l NaOH. The slurry was preheated in a reactor to 95° C. under a mixer speed of 2500 rpm and held at 95° C. for 1 hour. Then the temperature was raised to 170° C. and the slurry was held at 170° C. for 50 min. After filtration and drying, the product obtained had an average particle size of 10.2μ. After the first stage of hydrothermal treatment, the average particle size was 1.25μ.

EXAMPLE IV

The starting mixture was prepared and processed as in Example III except that 100 g/l NaOH was used. The resulting product had an average particle size of 9.2μ.

EXAMPLE V

In a bleaching experiment, a slurry containing 105 g kaolin clay, 118 g commercial sodium silicate ($SiO_2/Na_2O$=3.25) and 1366 g water was treated with oxygen in a reactor at room temperature by bubbling the oxygen through the slurry for 10 minutes. The reactor was sealed and an oxygen overpressure of 200 psi was applied. Then the reactor was heated to 170° C. and held at this temperature for 50 min. at a mixer speed of 2500 rpm., under a total pressure of 440 psi. The resultant product had a GE brightness of 89.3 (TAPPI Procedure T-646-os-75), as compared with 87.8 without oxygen treatment.

EXAMPLE VI

The starting mixture was prepared and processed as in Example V except that the oxygen overpressure was not applied and the reactor pressure was 120 psi. The resulting product had a brightness of 89.0.

It can be seen that the present invention provides improvements in the field of hydrothermal treatment of clays in that the clay itself can be used as the source of the sodium silicate solution aggregating agent or glue; clays unsuitable for calcination can be hydrothermally treated by such solution to produce aggregated clay products; the invention offers versatility in the mode of effecting the treatment, and the treatment can be made unitary with bleaching. Further aspects of the oxidative bleaching will now be set forth.

EXAMPLE VII

Two identical reactions were carried out in a 2 liter Parr high pressure reaction vessel with a total solids concentration of 6%. In this reaction 63 g of hydrous, waterwashed grey kaolin, the particles of which are 90% by weight <0.5μ, and having a 75 G.E. brightness, were mixed with 71 grams of commercial sodium silicate with a specific gravity of 1.41 and a $SiO_2/Na_2O$ ratio of 3.25, and 1366 grams of water. In reaction A, pure $O_2$ was bubbled through the reaction mixture at a flow rate of 100 ml/min for 10 minutes at room temperature prior to beginning the heat-up step. In reaction B, no $O_2$ was passed through the reactor. The heating step was begun in the standard procedure. In both reactions, the vessel was heated to 20020 C. and held for 50 minutes with mixing (2500 rpm). At the end of the 50 minutes, the vessel and its contents was brought to room temperature by circulating cool water through an internal coil.

The resulting solution was filtered using a vacuum filter fitted with a Whatman #1 filter paper. In each case, half of the resulting solid filler product was removed and dried. The other half was washed with hot (90° C.) water (to remove any remaining unreacted salts and organics). Both halves were oven dried overnight at 110° C. and pulverized three times through a Raymond mill prior to analysis for $TiO_2$, $Ti_2O_3$, G.E. brightness and particle size distribution. Table I contains the data yielded. It can be seen from the data in this example that (a) the product of this reaction has a particle size distribution indicating a coarsening in the particles attributed to chemical aggregates in the presence of sodium silicate under pressure at 200° C.;

(b) there is a significant increase in the brightness of the sodium silicate aggregated product vs the feed material: 89 vs 75, G.E. brightness;

(c) the brightness of the product that was reacted in an oxidizing environment has a 1.3 unit higher brightness than the product reacted in a non-oxidizing environment (89.7 vs 8.4 G.E.) for unwashed samples.

(d) The brightness of the aggregated product can be further increased by removal of soluble salts and filtrate containing organics from the filter cake prior to drying.

TABLE I

| Product | G.E. Brightness | $TiO_2$ | $Fe_2O_3$ | <10μ | <5μ | <2μ | <1μ | <.5μ | <.25μ |
|---|---|---|---|---|---|---|---|---|---|
| Feed A | 78 | 1.01 | .58 | 100 | 96 | 89 | 76 | 54 | 32 |

Characterization data of reaction products from reaction with and without the addition of $O_2$ prior to reaction at 200° C. for 50 minutes in the presence of sodium silicate.

TABLE I-continued

Characterization data of reaction products from reaction with and without the addition of O₂ prior to reaction at 200° C. for 50 minutes in the presence of sodium silicate.

| Product | G.E. Brightness | TiO$_2$ | Fe$_2$O$_3$ | <10µ | <5µ | <2µ | <1µ | <.5µ | <.25µ |
|---|---|---|---|---|---|---|---|---|---|
| unwashed (O$_2$) A | 89.7 | 1.01 | .57 | 96 | 86 | 10 | — | — | — |
| washed (O$_2$) A | 90.2 | | | | | | | | |
| B unwashed | 88.4 | .98 | .58 | 96 | 90 | 5 | — | — | — |
| B washed | 89.4 | | | | | | | | |

EXAMPLE VIII 76.5 grams of hydrous water washed grey kaolin whose particles are 90%<0.5µ, 35.4 g of sodium silicate as described in Example VII, and 1388 grams of water were reacted for 50 minutes at 230° C. at a mixer speed of 500 rpm after the reaction mixture had been saturated with pure O$_2$ bubbles for 10 minutes. The resultant product was cooled, filtered, dried and pulverized as described in Example VII above. This reaction was repeated to generate sufficient amount of material to be evaluated in a paper filling/paper coating application. The pigment described was evaluated in a standard LWC application. It was found to provide excellent sheet optical properties, and good calendarability, printability and sheet coverage.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A method of aggregating kaolin clay particles which comprises the following steps:
   (a) calcining kaolin clay at a temperature in the range of about 1000°–1200° C.;
   (b) digesting the calcined clay in a solution containing 5–400 g/l NaOH;
   (c) separating the solution obtained from the digestion;
   (d) subjecting uncalcined kaolin clay to hydrothermal treatment with said solution at a temperature in the range of about 130°–250° C. for 0.1–4 hr., with a mixer speed in the range of about 500–2500 rpm under a pressure of about 30–360 psi at a solids concentration of about 4–25% to cause aggregation of the clay particles to take place; and
   (e) separating the aggregated product from the liquid phase.

2. The method as set forth in claim 1 in which said liquid phase, after addition of NaOH, is re-used for digestion of a further portion of calcined clay.

3. The method as set forth in claim 1 in which said uncalcined clay is low grade or waste material not suitable for calcination.

4. The method as set forth in claim 1 in which calcination is effected at about 1100° C.; digestion at 90°–95° C. with a charge of at least 280 g clay per liter NaOH solution; aggregation at about 170° C. and 120–140 psi at a solids concentration of 6–10%.

5. A method of aggregating kaolin clay particles which comprises the following steps:
   (a) calcining kaolin clay at a temperature in the range of 1000°–1200° C.;
   (b) subjecting the calcined clay to a first stage hydrothermal treatment at about 80°–105° C. in a solution containing 5–400 g/liter NaOH;
   (c) subjecting the calcined clay to a second stage hydrothermal treatment at 140°–250° C. and;
   (d) recovering the product.

6. The method as set forth in claim 5 in which the pressure in the second stage is in the range of 120–340 psi.

7. The method as set forth in claim 5 in which the two stages are carried out without interruption.

8. The method as set forth in claim 5 in which the stages are carried out separately with addition of uncalcined clay after the first stage is completed.

9. The method as set forth in claim 5 in which a cake from the first stage is partially or wholly substituted by uncalcined clay.

10. The method as set forth in claim 1 or claim 5 which comprises carrying out a hydrothermal treatment in the presence of added oxygen or an oxidative bleaching compound.

11. A method of increasing the brightness of kaolin clay during hydrothermal treatment which comprises the following steps:
   (a) preparing a slurry containing kaolin clay, sodium silicate and water;
   (b) bubbling oxygen through the slurry at ambient temperature and atmospheric pressure in a reactor;
   (c) sealing the reactor; and
   (d) subjecting the slurry to hydrothermal treatment at elevated temperature and pressure.

12. The method as set forth in claim 11 in which, after step (c), additional oxygen pressure is applied of above 0 to 200 psi.

13. A method of increasing the brightness of a kaolin clay which is aggregated by hydrothermal treatment which comprises preparing a slurry containing kaolin clay, sodium silicate and water; and subjecting the slurry to hydrothermal treatment at elevated temperature and pressure, in the presence of an oxygen-enriched atmosphere.

* * * * *